US008465578B2

(12) United States Patent
Lussier

(10) Patent No.: US 8,465,578 B2
(45) Date of Patent: Jun. 18, 2013

(54) INKJET PRINTING INK SET

(75) Inventor: Barbara Boland Lussier, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 13/076,940

(22) Filed: Mar. 31, 2011

(65) Prior Publication Data

US 2012/0247365 A1 Oct. 4, 2012

(51) Int. Cl.
*C09D 11/02* (2006.01)

(52) U.S. Cl.
USPC .................................. 106/31.6; 106/31.65

(58) Field of Classification Search
USPC .................................. 106/31.6, 31.65
See application file for complete search history.

(56) References Cited

U.S. PATENT DOCUMENTS

| | | | |
|---|---|---|---|
| 4,734,711 A | 3/1988 | Piatt et al. | |
| 5,092,059 A | 3/1992 | Wimberger et al. | |
| 5,261,166 A | 11/1993 | Seeley et al. | |
| 5,394,177 A | 2/1995 | McCann et al. | |
| 5,423,260 A | 6/1995 | Goldberg et al. | |
| 5,925,178 A | 7/1999 | Martin et al. | |
| 5,948,512 A * | 9/1999 | Kubota et al. | 428/195.1 |
| 6,039,796 A * | 3/2000 | Kubota et al. | 106/31.6 |
| 6,058,621 A | 5/2000 | Piccinino, Jr. et al. | |
| 6,075,069 A * | 6/2000 | Takemoto | 523/160 |
| 6,088,930 A | 7/2000 | Robin et al. | |
| 6,193,792 B1 * | 2/2001 | Fague | 106/31.65 |
| 6,277,183 B1 | 8/2001 | Johnson et al. | |
| 6,412,190 B1 | 7/2002 | Smith | |
| 6,428,160 B2 | 8/2002 | Roy et al. | |
| 6,471,430 B1 | 10/2002 | Gaus et al. | |
| 6,485,138 B1 * | 11/2002 | Kubota et al. | 347/96 |
| 6,588,888 B2 | 7/2003 | Jeanmaire et al. | |
| 6,943,037 B2 | 9/2005 | Anagnostopoulos et al. | |
| 7,108,367 B2 | 9/2006 | Ushirogouchi et al. | |
| 7,803,221 B2 | 9/2010 | Magdassi et al. | |
| 7,918,551 B2 | 4/2011 | Kinas et al. | |

(Continued)

FOREIGN PATENT DOCUMENTS

| | | |
|---|---|---|
| EP | 0 465 124 | 8/1994 |
| EP | 0 735 120 | 10/1996 |
| EP | 1 013 450 | 7/2006 |
| WO | WO 88/07103 | 9/1988 |

*Primary Examiner* — Kaj K Olsen
*Assistant Examiner* — Veronica F Faison
(74) *Attorney, Agent, or Firm* — Andrew J. Anderson

(57) ABSTRACT

A process for printing an image includes printing a substrate with an aqueous inkjet ink and drying the printed image with a near-infrared drying system, wherein the inkjet ink is a yellow or magenta inkjet ink and comprises a yellow or magenta colorant and a distinct near-infrared absorbing compound. Inkjet ink sets for use with an inkjet printing system employing a near-infrared drying system in the process include at least a black ink and a yellow ink, wherein the yellow ink comprises a yellow colorant and dispersed nanoparticulate colloidal silica at a concentration of from 0.1 to about 10 wt %, and the black ink comprises a black colorant and dispersed nanoparticulate colloidal silica at a concentration of from 0 wt. % to at most ½ of the wt. % of the dispersed nanoparticulate colloidal silica in the yellow ink. Various embodiments provide a process for inkjet printing and drying inks with improved absorption in the near-IR region of the spectrum for improved drying performance of aqueous, hypsochromic inks, and an inkjet ink set with improved balanced near-IR drying of black and yellow inkjet inks.

16 Claims, 3 Drawing Sheets

ABSORBANCE WITH YELLOW INK AS A BASELINE.

U.S. PATENT DOCUMENTS

2002/0006425 A1* 1/2002 Takaoka et al. ............... 424/405
2009/0031579 A1 2/2009 Piatt et al.
2009/0326520 A1 12/2009 Lee et al.
2012/0249630 A1 10/2012 Bugner et al.

* cited by examiner

INKJET PRINTING INK SET

CROSS-REFERENCE TO RELATED APPLICATIONS

Reference is made to commonly assigned U.S. Ser. No. 13/076,976, filed Mar. 31, 2011, directed towards "Inkjet Printing Process," the disclosure of which is incorporated by reference herein in its entirety.

FIELD OF THE INVENTION

The invention relates generally to the field of inkjet printing systems and processes, and in particular to inkjet printing systems and processes employing infrared emission drying systems. More specifically, the invention relates to use of specially formulated inkjet inks in such systems and processes, and in particular in continuous inkjet printing systems and processes, which enable high speed printing and drying.

BACKGROUND OF THE INVENTION

Inkjet printing is a non-impact method for producing printed images by the deposition of ink droplets in a pixel-by-pixel manner to an image-recording element in response to digital signals. There are various methods that can be used to control the deposition of ink droplets on the image-recording element to yield the desired printed image. In one process, known as drop-on-demand inkjet, individual droplets are projected as needed onto the image-recording element to form the desired printed image. Common methods of controlling the ejection of ink droplets in drop-on-demand printing include thermal bubble formation (thermal inkjet (TIJ)) and piezoelectric transducers. In another process known as continuous inkjet (CIJ), a continuous stream of droplets is generated and expelled in an image-wise manner onto the surface of the image-recording element, while non-imaged droplets are deflected, caught, and recycled to an ink sump. Inkjet printers have found broad applications across markets ranging from desktop document and photographic-quality imaging, to commercial printing and industrial labeling. In either drop-on-demand or continuous inkjet systems, it is necessary to assign a different fluid ink color to a separate printhead. Therefore, in producing color prints, several layers of wet ink may be deposited on a single printed medium.

Continuous inkjet (CIJ) printers typically comprise two main components, a fluid system and one or more printheads. Ink is delivered through a supply line from a supply reservoir to a manifold that distributes the ink to a plurality of orifices, typically arranged in linear array(s), under sufficient pressure to cause ink streams to issue from the orifices of the printhead. Stimulations are applied to the printhead to cause those ink streams to form streams of spaced droplets, which are deflected into printing or non-printing paths. The non-printing droplets are returned to the supply reservoir via a droplet catcher and a return line. U.S. Pat. Nos. 4,734,711 and 5,394,177 and EP 1,013,450 describe in detail the design of a fluid system for CIJ apparatus. More recent developments of CIJ printing apparatus and printhead fabrication can be found in U.S. Pat. Nos. 6,588,888 and 6,943,037.

Traditional printing presses are able to use high viscosity inks to obtain vibrant, high-density colors. However, high speed inkjet printing and in particular continuous ink jet systems employ low viscosity solutions of dyes or pigments in a water solvent. It is known that increasing the amount of dye or pigment applied to the paper can brighten the colors. However, this process also increases the amount water solvent applied to, and absorbed by, the paper or other media being printed. Absorption of water may cause a paper wrinkling effect called cockle, a wicking and spread of colors referred to as color-to-color bleed, and/or a show-through to the back side of the paper. Efficient drying of inkjet inks on commercial, high speed inkjet printing presses is critical to good image quality. Drying of aqueous inks by unaided evaporation and absorption into the media may not be adequate for high speed presses, particularly when the print media is non-porous and thus poorly absorbing. Auxiliary driers have been proposed to help alleviate this problem.

To remove water from the printed medium, high speed inkjet printing systems such as continuous inkjet systems may utilize an end-of-line dryer that is similar to those used in printing presses. U.S. Pat. No. 5,423,260, e.g., discloses use of an end-of-line dryer to remove water from the printed medium only when all wet ink has been deposited and is at its maximum. It has further been suggested to use infrared lamps or microwave radiation to preferentially heat the ink relative to the unprinted receiver media. Further reductions in the time required between printing and drying have been realized by placing dryers between two printheads to dry the ink before significant amounts of the ink can wick into or otherwise be absorbed by the receiver media. Placement of dryers between printheads is referred to herein as "inter-station drying," and has been disclosed in, e.g., U.S. Pat. No. 6,428,160. Inter-station drying is effective to provide better optical density, sharper edges, less show through and reduced cockle. In multi-color systems, high-speed dryers placed between the different color printheads reduce color-to-color bleed, and enable more ink to be employed without overly wetting the receiver media.

The use of infrared (IR), and in particular near-infrared (near-IR, or n-IR) (750-1500 nm) drying systems, have been proposed to reduce operating cost and improve productivity by utilizing radiation in the near-infrared part of the spectrum, where electromagnetic radiation for such near-IR systems typically reaches maximum power at a wavelength (lambda max) of approx. 810 nm. When the n-IR radiation is absorbed by the ink and/or substrate, it is converted to heat, thereby increasing the rate of evaporation of the water and optional co-solvents of the inks.

U.S. Pat. No. 5,261,166 discloses a dryer comprising a plurality of infrared burner units with air floatation dryer elements between the infrared units. U.S. Pat. No. 6,412,190 also employs infrared burners in conjunction with air bars. U.S. Pat. No. 6,088,930 employs alternating infrared sources and blower units. WO 88/07103 describes a dryer unit in which the lamp used for generation of infrared radiations enclosed in a box with a reflector behind the lamp and an infrared transmitting window in front of the lamp. U.S. Pat. No. 5,092,059 describes a dryer unit in which an infrared source directs infrared at the paper through a Quartz window. U.S. Pat. No. 6,058,621 describes a dryer in which a plurality of radiant heating bars direct radiation at photosensitive paper. Reflectors are placed behind the infrared lamps. Air flows out between the reflectors, impinging on the paper. US 2009/0031579 discloses a dryer operable with an inkjet printhead which comprises a radiant heat source and an air bearing structure comprising a microporous filter adapted to convert air flow to a diffuse flow.

The use of colloidal silica in inkjet inks has been proposed for various reasons. Typically, such silica particles have been proposed to be employed to affect the physical properties of the resulting printed image. U.S. Pat. No. 5,925,178, e.g., discloses use of colloidal silica to increase optical density and improve abrasion resistance of solid area patches when printed on coated papers and films. U.S. Pat. No. 6,193,792 discloses use of colloidal silica along with a specified surfactant in pigmented inkjet inks. U.S. Pat. No. 6,277,183 discloses the use of silica and metal oxides in inks to decrease drying times, increase water and smear resistance, increase optical density, and provide better quality images with less intercolor bleed. U.S. Pat. No. 7,803,221 discloses use of silica nanoparticles in inks for printing on ceramic surfaces, wherein the inks are fused to the ceramic surfaces upon firing.

SUMMARY OF THE INVENTION

Although the use of infrared drying systems work well for inks that have significant absorption in the IR region of the spectrum, they may not be adequate for inks with minimal absorption in this region of the spectrum. For example, the efficiency of absorption of the near-IR radiation is typically very good for inks containing carbon black, and reasonably good for cyan inks as well, but may be inadequate for inks that absorb strongly hypsochromic of the near-IR emitter, such as yellow and magenta inks.

In accordance with one embodiment, the invention provides a process for printing an image comprising printing a substrate with an aqueous inkjet ink and drying the printed image with a near-infrared drying system, wherein the inkjet ink is a yellow or magenta inkjet ink and comprises a yellow or magenta colorant and a distinct near-infrared absorbing compound.

In accordance with another embodiment, the invention is directed towards an inkjet ink set for use with an inkjet printing system employing a near-infrared drying system, comprising at least a black ink and a yellow ink, wherein the yellow ink comprises a yellow colorant and dispersed nanoparticulate colloidal silica at a concentration of from 0.1 to about 10 wt %, and the black ink comprises a black colorant and dispersed nanoparticulate colloidal silica at a concentration of from 0 wt. % to at most ½ of the wt. % of the dispersed nanoparticulate colloidal silica in the yellow ink.

The various embodiments of the invention provide a process for inkjet printing and drying inks with improved absorption in the n-IR region of the spectrum for improved drying performance of aqueous, hypsochromic inks, and an inkjet ink set with improved balanced n-IR drying of black and yellow inkjet inks.

DETAILED DESCRIPTION OF THE INVENTION

Figure 1:
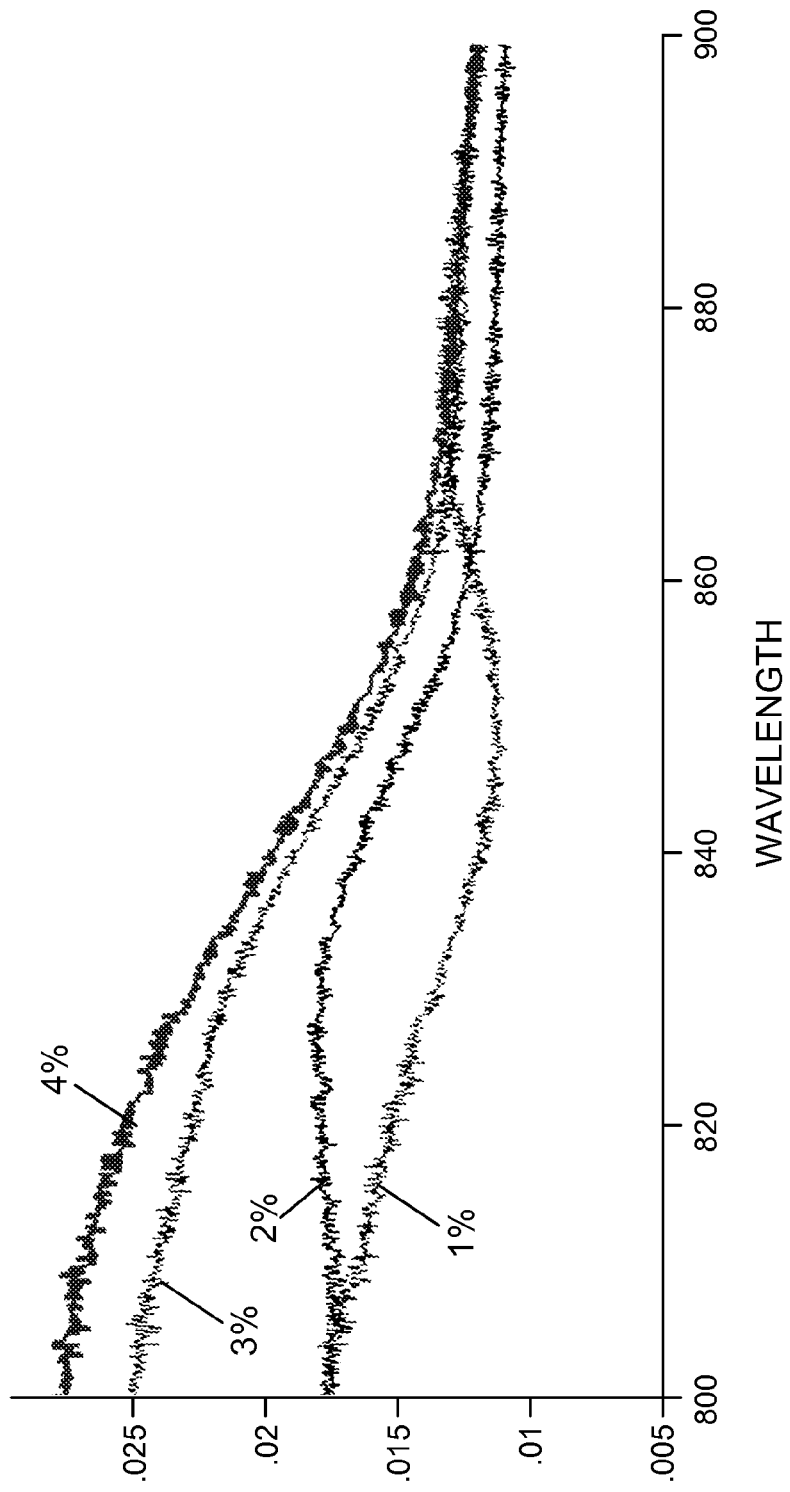
FIG. 1 is a graph illustrating net absorption of colloidal silica in yellow inks in the near-infrared spectra above that of yellow ink without colloidal silica.

In particular embodiments, the invention is directed towards an inkjet printing process, and an ink set for use in an inkjet printing system, where the printing process and system employ a continuous inkjet printer. In such CIJ printers, a continuous stream of droplets is generated, a portion of which are deflected in an image-wise manner onto the surface of the image-recording element, while un-imaged droplets are caught and returned to an ink sump. In the system of continuous inkjet printing a main fluid supply is provided with the printing fluid composition, which is then delivered from the main fluid supply to a printhead, where a continuous stream of the ink composition is ejected from the printhead, which continuous stream then is broken into spaced droplets. In response to electrical signals received from a control mechanism, the droplets are then selected between printing droplets for marking a substrate and nonprinting droplets that are collected and returned to the main fluid supply. Continuous inkjet systems which may be used in accordance with specific embodiments of the present invention include those disclosed, e.g., in U.S. Pat. Nos. 6,588,888, 6,554,410, 6,682, 182, and 6,575,566 to Jeanmaire et al.; US Publication No. 2003/0202054 to Jeanmaire et al.; U.S. Pat. Nos. 6,793,328 and 6,866,370 to D. Jeanmaire; and U.S. Pat. No. 6,517,197 to Hawkins et al.; the disclosures of which are herein incorporated in their entirety by reference. In another embodiment, an apparatus capable of controlling the direction of the formed printing and non-printing drops by asymmetric application of heat to the fluid stream that initializes drop break-up and serves to steer the resultant drop may be employed, as disclosed in U.S. Pat. Nos. 6,079,821 and 6,505,921 to Chwalek et al., the disclosures of which are herein incorporated in their entirety by reference. Useful ink agitation, heated ink supply and printhead and fluid filtration means for CIJ pigmented inkjet ink compositions are described in U.S. Pat. No. 6,817,705 to Crockett et al., the disclosure of which is herein incorporated in its entirety by reference. Printer replenishing systems for maintaining ink quality and countering the effects of ink volatile component evaporation are described in U.S. Pat. No. 5,526,026 to M. Bowers and U.S. Pat. No. 5,473,350 to Mader et al., and EP 0 597 628 A1 to Loyd et al., the disclosures of which are herein incorporated in their entirety by reference.

In accordance with an embodiment of the invention, inkjet printed images are dried with a near-infrared drying system. Useful drying systems may include components such as described in U.S. Pat. Nos. 5,261,166, 6,412,190, 6,088,930, 6,058,621, and 5,092,059, and further in US 2009/0031579 and WO 88/07103, all referenced above, the disclosures of which are incorporated herein by reference. In a near-IR drying system, the source of near infrared (n-IR) radiation may be, e.g., a n-IR lamp or LED array. Typically, the source of n-IR has a peak emission at wavelengths in the range of from 750 nm to 1400 nm, e.g. at 810 nm. Near-infrared sources suitable for use in the present invention include those described, e.g., in U.S. Pat. No. 7,820,991, also incorporated by reference herein. Commercially available near-IR dryers include ADPHOS NIR dryers, available from Adphos Innovative Technology GmbH. Near-IR heating is especially suitable for use in the present invention because it is absorbed well by the ink containing a distinct near-infrared absorbing compound, but may only be poorly absorbed by the substrate. Accordingly, the ink is preferentially heated and the substrate experiences a lesser degree of heating. In that way, relatively heat sensitive substrates can be printed and dried at high printing speeds.

The printing inks employed in the present invention are preferably aqueous-based printing inks. "Aqueous-based" is defined herein to mean the printing ink comprises mainly water as the carrier medium for the remaining printing ink components. In a preferred embodiment, the printing inks employed in the present invention comprise at least about 50 weight percent water. Ink compositions containing colorants used in inkjet printers can be classified as either pigment-based, in which the colorant exists as pigment particles suspended in the ink composition, or as dye-based, in which the colorant exists as a fully solvated dye species that consists of one or more dye molecules. While inks comprising either dye or pigment colorants may be employed, in specific embodiments of the present invention the printing inks employed are pigment-based inks. Pigments are highly desirable since they are far more resistant to fading than dyes. Pigment-based inks are defined as inks containing at least a dispersion of water-insoluble pigment particles. In a further embodiment, a clear ink may also be employed in combination with colored inks. A clear ink is defined as an ink composition that does not contain colorants, including colored pigments or colored dyes. The clear ink is typically aqueous based, and can contain humectants and polymers as may be used in the colored inks employed in the art of inkjet printing. Clear inks can be slightly colored due to the presence of humectants, polymers, or impurities, but are not intentionally colored by the addition of a colorant.

In accordance with one embodiment of the invention, an image is printed on a substrate with an aqueous inkjet ink and the printed image is dried with a near-infrared drying system, wherein the inkjet ink is a yellow or magenta inkjet ink and comprises a yellow or magenta colorant and a distinct near-infrared absorbing compound. Typical, known near-IR absorbing compounds include dyes and inorganic materials. Preferably, the near-IR absorbing compound employed is substantially colorless, so as not to significantly impact the color of the printed image. Near-infrared absorbing dyes are known and commercially available, and typically have absorption peaks in the range of from 750-1100 nm. An example of an effective nearly colorless near-IR-absorbing dye compound is dye D-1 shown below:

"Near Infrared Absorption Spectra of Silica: OH Overtones," APPLIED SPECTROSCOPY, Vol. 25, No. 3, pp. 378-9 (1971), and in US2009/0326520. It has further been found that upon drying, the dehydrated silica becomes transparent to near-IR radiation reaping an additional advantage of allowing the radiation to pass through the upper, dried layer to the lower layers of the coating. This allows for very efficient and rapid drying. In addition, the silica cools as it dries, thus preventing thermal damage to the substrate. These properties and added advantages of nanoparticulate colloidal silica to improve near-IR drying are unknown in the art.

Nanoparticulate colloidal silica employed in the invention should be of a particle size sufficiently small as to not clog the printing nozzles or affect the gloss of the printed image. Preferably, the colloidal silica comprises non porous particles having a volume based average particle size of less than 100 nm, more preferably less than 50 nm. Commercially available aqueous silica dispersions, such as LUDOX (W.R. Grace & Co.) silica dispersions, typically have particle sizes below 25 nm (e.g., between 7 and 22 nm), are non-porous and are suitable for this application. There are anionic or cationic, modified or non-modified silica particles with or without polymeric stabilizers. Anionic particles are preferred, and particularly sodium aluminate and amine-stabilized particles such as LUDOX-AM and LUDOX AS dispersions. Such aqueous dispersions of nanoparticulate colloidal silica comprise hydrated silica particles which advantageously are absorbing in the near-IR spectrum from 750 nm to 900 nm, and upon drying become relatively transparent to near-IR radiation.

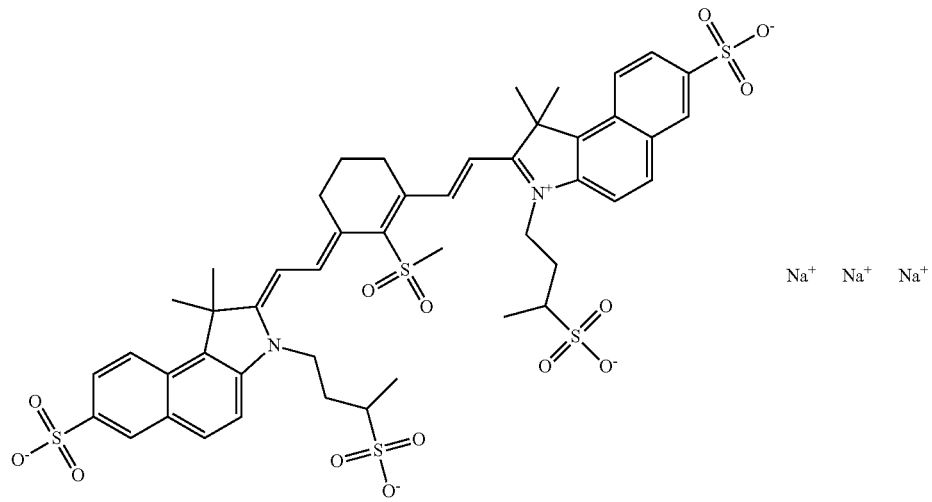 [SMILES: CC(CCN1/C(=C\C=C2/CCCC(/C=C/C3=[N+](CCC(C)S(=O)(=O)[O-])c4ccc5cc(S(=O)(=O)[O-])ccc5c4C3(C)C)=C2S(C)(=O)=O)C(C)(C)c2c1ccc1cc(S(=O)(=O)[O-])ccc21)S(=O)(=O)[O-] ; [Na+] ; [Na+] ; [Na+]]

While nearly colorless near-IR absorbing dyes are available, such dyes usually exhibit a relatively narrow absorption band-width, and thus may not be efficient energy absorbers, failing to utilize the full emission of a near-IR drying lamp. Broader band-width absorbing dyes, on the other hand, may be colored materials which would be unacceptable in lighter yellow and magenta colored inks. In a preferred embodiment, an aqueous dispersion of nanoparticulate, colloidal silica is employed as the distinct near-infrared absorbing compound. Such colloidal silica is essentially colorless, and has been found to absorb in the near-IR to enhance the ink's energy absorption of near-IR radiation and convert it to thermal energy. The absorption of near-IR radiation by aqueous dispersed silica has been described, e.g., by C. R. Elliott et al. in An ink set is defined as a set of two or more inks. An ink set may contain inks of different colors, for example, cyan, magenta, yellow, red, green, blue, orange, violet, or black. In one embodiment, the invention is directed towards an inkjet ink set for use with an inkjet printing system employing a near-infrared drying system, comprising at least a black ink and a yellow ink, wherein the yellow ink comprises a yellow colorant and dispersed nanoparticulate colloidal silica at a concentration of from 0.1 to about 10 wt %, preferably from about 1 to 5 wt %, and more preferably from about 1 to 4 wt. %, and the black ink comprises a black colorant and dispersed nanoparticulate colloidal silica at a concentration of from 0 wt. % to at most ½ of the wt. % of the dispersed nanoparticulate colloidal silica in the yellow ink. In such embodiments, the black colorant of the black ink preferably comprises carbon black pigment. By excluding or employing colloidal silica at a substantially lower concentration in the black ink than the concentration in the yellow ink (e.g., less than half the wt. % concentration), excessive heating of black ink printed areas (due to the greater near-IR absorbance of black colorants such as carbon black pigment) can be avoided while providing sufficient near-IR energy absorbance to effectively dry yellow ink printed areas due to the higher percentage of colloidal silica in the yellow ink. Differential heating of composite printed images can thus be reduced, and uniform drying improved.

In a further embodiment of the invention, an inkjet ink set is provided which further includes at least a magenta ink and a cyan ink in addition to the yellow ink and the black ink. In such embodiment, the magenta ink may preferably also comprise dispersed nanoparticulate colloidal silica at a concentration of from 0.1 to about 10 wt %, preferably from about 1 to 5 wt %, and more preferably from about 1 to 4 wt. %, and the black ink comprise dispersed nanoparticulate colloidal silica at a concentration of from 0 wt. % to at most ½ of the wt. % of the dispersed nanoparticulate colloidal silica in the magenta ink. In a further embodiment, the cyan ink may also comprise dispersed nanoparticulate colloidal silica at a concentration of from 0 wt. % to at most ½ of the wt. % of the dispersed nanoparticulate colloidal silica in the yellow ink. Such embodiments advantageously enable further balancing of drying of differently colored printed areas of an image.

Useful ink sets also include, in addition to the black, cyan, magenta, and yellow inks, complimentary colorants such as red, blue, violet, orange, or green inks. In addition, the ink set may comprise light and dark colored inks, for example, light cyan and light magenta inks commonly used in the ink sets of wide format printers. It is possible to include one or more inks that comprise a mixture of different colored pigments in the ink set. An example of this is a carbon black pigment mixed with one or more colored pigments or a combination of different colored pigments. An ink set may also include one or more pigment-based inks in combination with one or more clear inks. Clear inks employed in the invention may also comprise dispersed nanoparticulate colloidal silica. An ink set may also include at least one or more pigment-based inks in combination with additional inks that are dye-based ink. An ink set may further comprise one or more inks containing a self-dispersing carbon black pigment ink which is used primarily for printing of text and a plurality of cyan, magenta, yellow, and black inks which are used primarily for photographic quality printing.

CIJ printing is a very high speed printing process, and it is desired to operate roll-fed transport presses at substrate transport speeds in excess of 100 m/min and preferably in excess of 200 m/min. Printing speed alone imposes some limitations on ink formulation relative to slower drop-on-demand printing techniques, simply on the basis of the short time requirements for adequately drying the printed substrate moving at full speed in the press before roll wind-up, and printing on most substrates at such high speeds generally require auxiliary drying, such as near-IR drying in accordance with the present invention. On some substrates, such as relatively nonporous coated papers and printing ink impervious plastic films and metals, printing transport speeds of about 10 m/min and higher may require auxiliary drying and the present invention is particularly suitable therewith. Surprisingly, however, other features of CIJ printhead operation can allow wider ink formulation latitude than is possible in DOD printing in other respects. Ink formulation considerations specific to traditional CIJ printing are described in W. Wnek, *IEEE Trans*. 1986, 1475-81, which elucidates the ink performance requirements for drop formation, deflection and catching of non-printing drops, recirculation of the ink to the printhead from the storage reservoir for future printing, and also for commercial ink-media image quality and durability. In order to achieve improved near-IR drying in a high speed inkjet printing process in yellow, magenta, and clear inks while minimizing other potential impacts of incorporation of colloidal silica, use of colloidal silica at a concentration of from 0.1 to less than 10 wt %, preferably from about 1 to 5 wt %, and more preferably from about 1 to 4 wt. % or from about 1 to 3 wt %, is advantageously employed.

A wide variety of organic and inorganic pigments, alone or in combination with additional pigments or dyes, can be in the printing inks employed in the present invention. Pigments that may be used in the invention include those disclosed in, for example, U.S. Pat. Nos. 5,026,427; 5,085,698; 5,141,556; 5,160,370; and 5,169,436. The exact choice of pigments will depend upon the specific application and performance requirements such as color reproduction and image stability. Dispersed pigment particles are typically present at from 1 to 10 wt % in the pigmented inkjet printing fluids employed in the invention, preferably 1 to 6 wt %. Pigments suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of organic pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; and C.I. Pigment Brown 1, 5, 22, 23, 25, 38, 41, 42.

Pigment-based ink compositions employing non-self-dispersed pigments that are useful in pigmented printing inks employed in the invention may be prepared by any method known in the art of inkjet printing. Useful methods commonly involve two steps: (a) a dispersing or milling step to break up the pigments to desirable particle size, and (b) a dilution step in which the pigment dispersion from step (a) is diluted with the remaining printing fluid components to give a working strength ink. The milling step (a) is carried out using any type of grinding mill such as a media mill, a ball mill, a two-roll mill, a three-roll mill, a bead mill, an air-jet mill, an attritor, or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate break up of the pigments to desired particle size. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b).

A dispersant is optionally present in the milling step (a) in order to facilitate deaggregation or comminution of the pigments into primary particles. For the pigment dispersion obtained in step (a) or the ink composition obtained in step (b), a dispersant may be present in order to maintain particle stability and prevent settling. Dispersants suitable for use in the invention include, but are not limited to, those commonly used in the art of inkjet printing. For aqueous pigment-based ink compositions, particularly useful dispersants include anionic surfactants such as sodium dodecylsulfate, or potassium or sodium oleylmethyltaurate as described in, for example, U.S. Pat. Nos. 5,679,138, 5,651,813 or 5,985,017.

Polymeric dispersants are also known and can be used to disperse the pigment particles prior to, or during the milling step. Typically, these polymeric dispersants are copolymers made from hydrophobic and hydrophilic monomers. Examples of polymeric dispersants for pigment particles include random and block copolymers having hydrophilic and hydrophobic portions; see for example, U.S. Pat. Nos. 4,597,794, 5,085,698, 5,519,085, 5,272,201, 5,172,133, and 6,043,297, and WO 2004/111140A1; and graft copolymers; see for example, U.S. Pat. Nos. 5,231,131, 6,087,416, 5,719, 204, and 5,714,538. Among these polymeric dispersants anionic polymeric dispersants are especially useful.

Polymeric dispersants useful for dispersing the pigment particles employed in the present invention are not limited in the arrangement of the monomers comprising the dispersant. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B and C blocks is chosen to be the hydrophilic monomer and the remaining blocks are hydrophobic blocks dissimilar from one another.

Polymeric dispersants useful for dispersing the pigment particles can be selected from acrylics and styrene-acrylics. Styrene-acrylic polymeric dispersants especially useful in the present invention are copolymers of styrenic monomers and carboxylate monomers. Examples of such dispersants include copolymers of styrene or alphamethyl styrene and acrylic acid or methacrylic acid (such as the JONCRYLBASF or TRUDOT Mead Westvaco polymers) or styrene maleic anhydride and styrene maleic anhydride auric acid copolymers (such as SMA-1440, SMA-17352, SMA-1000, SMA-2000 Sartomer Inc.).

Acrylic polymeric dispersants useful in the present invention are typically formed from one or more acrylic monomer and one or more ionizable monomer, such as, for example carboxyalted or sulfonated monomers. Acrylic polymeric dispersants are typically formed from one or more hydrophobic acrylate monomer including, for example, methyl-methacrylate, ethylmethacrylate, butylmethacrylate, hexylmethacryate, octylmethacrylate and decylmethacrylate.

Other especially useful polymeric dispersants are those where the hydrophobic monomer is selected from benzyl methacrylate or acrylate, or from acrylic acid esters containing an aliphatic chain having twelve or more carbons and where the hydrophilic monomer is a carboxylated monomer. Examples of acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, and decyltetradecyl methacrylate. Preferably the methacrylate or acrylate monomer is stearyl or lauryl methacrylate or acrylate. The hydrophobic portion of the polymer may be prepared from one or more of the hydrophobic monomers.

Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof. Preferably, the hydrophilic monomer is methacrylic acid. Particularly useful polymeric pigment dispersants are further described in US 2006/0012654 A1 and US 2007/0043144 A1, the disclosures of which are incorporated herein by reference.

Typically, the weight average molecular weight of the polymeric dispersant has an upper limit such that it is less than 50,000 Daltons. Desirably the weight average molecular weight of the copolymer is less than 25,000 Daltons; more desirably it is less than 15,000 and most desirably less than 10,000 Daltons. The copolymer dispersants preferably have a weight average molecular weight lower limit of greater than 500 Daltons.

Encapsulating type polymeric dispersants and polymeric dispersed pigments thereof can also be used in the invention. Specific examples are described in U.S. Pat. Nos. 6,723,785 and 6,852,777, and US Patent Publication Nos. 2004/0132942, 2005/0020731, 2005/0009951, 2005/0075416, 2005/0124726, 2004/0077749, and 2005/0124728. Encapsulating type polymeric dispersants can be especially useful because of their high dispersion stability on keeping and low degree of interaction with ink components. Composite colorant particles having a colorant phase and a polymer phase are also useful in aqueous pigment-based printing fluids of the invention. Composite colorant particles are formed by polymerizing monomers in the presence of pigments; see for example, U.S. Patent Publication Nos. 2003/0199614, 2003/0203988, or 2004/0127639. Microencapsulated-type pigment particles are also useful and consist of pigment particles coated with a resin film; see for example U.S. Pat. No. 6,074, 467.

Self-dispersing pigments, i.e., pigments that are dispersible without the use of a separate dispersant or surfactant, useful for the practice of the invention are those that have been subjected to a surface treatment such as oxidation/reduction, acid/base treatment, or functionalization through coupling chemistry. The surface treatment can render the surface of the pigment with anionic, cationic, or non-ionic groups. The preparation and use of covalently functionalized self-dispersed pigments suitable for inkjet printing are reported in U.S. Pat. Nos. 6,758,891; 6,660,075; 5,554,739; 5,707,432; 5,803,959; 5,922,118; 5,837,045; 6,280,513; 6,488,753; 6,506,239; 6,503,311; 6,852,156; and 6,494,943; and in WO 96/18695, WO 96/18546, WO 96/18689, WO 99/51690, WO 00/05313, WO 01/51566; and EP 1,479,732. Examples of commercially available self-dispersing type pigments include CAB-O-JET 200, CAB-O-JET-250, CAB-O-JET-260, CAB-O-JET-270, and CAB-O-JET 300 (Cabot Specialty Chemicals, Inc.); BONJET CW-1, CW-2 and CW-3 (Orient Chemical Industries, Ltd.); and AQUA BLACK 162 and 001 (Tokai Carbon, Ltd.).

Pigment particles useful in the invention may have any particle size that can be jetted through a printhead. Preferably, the pigment particles have a volume weighted mean particle size of less than about 0.5 micron. The pigment dispersions useful in pigment-based printing fluid compositions employed in the present invention desirably have a median particle diameter of less than 200 nm and more desirably less than 150 nm. In a particularly useful embodiment, 90 percent of the weight of the pigment particles in the distribution have a diameter less than 150 nm and desirably less than 100 nm.

In addition to or in place of dispersed pigment colorants, the aqueous inks employed in certain embodiments of the invention can contain dyes as primary or supplemental colorants. Dyes suitable for use in the invention include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Specific examples of dyes usable in the present invention include but are not limited to: Acid Yellows, Reactive Yellows, Food Yellows, Acid Reds, Direct Reds, Reactive Reds, Food Reds, Acid Blues, Direct Blues, Reactive Blues, Food Blues, Acid Blacks, Direct Blacks, Reactive Blacks, Food Black, CAS No. 224628-70-0 sold as JPD Magenta EK-1 Liquid from Nippon Kayaku Kabushiki Kaisha; CAS No. 153204-88-7 sold as INTRAJET Magenta KRP from Crompton and Knowles Colors; and the metal azo dyes disclosed in U.S. Pat. Nos. 5,997,622 and 6,001,161. Also useful in the invention as colorants are polymeric dyes or loaded-dye/latex particles. Examples of polymeric dyes are described in U.S. Pat. No. 6,457,822 and references therein. Examples of loaded-dye/latex particles are described in U.S. Pat. No. 6,431,700; US 2004/0186199; US 2004/0186198; US 2004/0068029; US 2003/0119984; and US 2003/0119938. The supplemental colorants used in the ink composition of the invention may be present in any effective amount, generally from about 1.0 to 10% by weight, and preferably from about 2.0 to 5% by weight.

Printing ink compositions, both colored and clear, useful in the invention may also preferably comprise a humectant in order to achieve reliable printing. Any water-soluble humectant known in the ink-jet art and compatible with the other requirements of the invention can be employed. By water-soluble is meant that a mixture of the employed humectant(s) and water is homogeneous. While an individual humectant can be employed, useful inkjet inks can employ mixtures of two, three or more humectants, each of which imparts a useful property to the inkjet ink. Representative examples of humectants which may be employed in the present invention include: (1) triols, such as; glycerol, 1,2,6-hexanetriol, 2-ethyl-2-hydroxymethyl-propane diol, trimethylolpropane, alkoxlated triols, alkoxylated pentaerythritols, saccharides, and sugar alcohols; and (2) diols, such as ethylene glycol, diethylene glycol, triethylene glycol, propylene glycol, polyalkylene glycols having four or more alkylene oxide groups, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol; and thioglycol or a mixture thereof. Desirable humectants are polyhydric alcohols having three or more hydroxyl groups. A particularly useful humectant is glycerol.

Typical aqueous-based ink compositions for drop-on-demand thermal printhead systems useful in the invention may contain, e.g., 5-35 weight percent humectant(s), especially from 6-25% humectant, most desirably from about 7-20% humectant. Inks comprising humectants having the aforementioned viscosity and concentration ranges are ideal for maintaining ink viscosities in an acceptable range for high speed firing from a thermal inkjet printhead with low variability in firing velocity. While higher levels may be typically preferred for use in drop-on-demand printers, the total humectant level of printing fluid compositions for CIJ printing is desirably 10% or less by weight, more preferably 8% or less by weight, and most preferably 6% or less by weight. A preferred range of humectant for CIJ printing fluids is from 0.5 to about 8% by weight, more preferably from 0.5 to about 6% by weight. The total humectant level of the ink is the sum of the individual sources of humectant ingredients, which may include humectant added directly during ink formulation, and for example humectant associated with a commercial biocide preparation as a supplemental ingredient, or with a commercial pigment dispersion preparation that may be present to prevent so-called "paint-flakes" of dried pigment cake forming around a bottle cap, as described in US Patent publication no. 2005/0075415 A1 to Harz et al. More desirably, the total humectant level is from about 1% to less than 10%, in order to facilitate drying of the inkjet printing recording material in a high speed printer while simultaneously encouraging higher equilibrium moisture content in dried ink film on hardware for redispersion and clean-up by ink, or by start-up and shut-down fluids, or by a printhead storage fluid.

The printing ink compositions employed in the present invention may also include a water miscible co-solvent or penetrant. Representative examples of co-solvents used in the aqueous-based printing fluid compositions include: (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols; such as ethylene glycol monomethyl ether, ethylene glycol monobutyl ether, ethylene glycol monoethyl ether acetate, diethylene glycol monomethyl ether, and diethylene glycol monobutyl ether acetate; (3) nitrogen-containing compounds, such as urea, 2-pyrrolidinone, N-methyl-2-pyrrolidinone, imidazolidinone, and 1,3-dimethyl-2-imidazolidinone; and (4) sulfur-containing compounds, such as 2,2'-thiodiethanol, dimethyl sulfoxide, and tetramethylene sulfone. Typical aqueous-based printing ink compositions useful in the invention may contain 2-15 weight percent co-solvent(s).

The pH of the aqueous printing ink compositions employed in the invention may be adjusted by the addition of organic or inorganic acids or bases. Inorganic bases are preferred; however, small amounts of organic bases, such as triethanolamine, may be used to adjust the pH of the printing fluid. Useful printing ink for drop-on-demand applications may have a preferred pH of from about 4 to 10, depending upon the type of pigment being used. Preferably, the pH of such printing ink is from 6 to 9, more preferably from 7 to 9. The pH of the inkjet ink composition directed at CIJ is desirably adjusted from about 7 to about 12; more desirably, the pH is about 8 to 10. When the ink composition is used in hardware with nickel or nickel-plated apparatus components, an anticorrosion inhibitor such as the sodium salt of 4- or 5-methyl-1-H-benzotriazole is desirably added and the pH adjusted to be from about 10 to about 11. When the ink composition is used with printheads with components fabricated from silicon that are in contact with the fluid, the ink composition pH is desirably adjusted to be from about 7 to about 9.5; more desirably, the pH ranges from about 7.5 to about 9. In order to reduce the risk of excessively protonating carboxylate anions associated with polymeric dispersants and anionic charge stabilized anti-abrasion polymers that might render the ink composition more susceptible to flocculation, pH levels lower than about 7 are desirably avoided. With hardware components fabricated from silicon in contact with the ink composition, pH levels higher than about 10 can induce significant rates of etch and corrosion that may impair the operation of the device over time. Typical inorganic acids include nitric, hydrochloric, phosphoric, and sulfuric acids. Typical organic acids include methanesulfonic, acetic, formic, and lactic acids. Typical inorganic bases include alkali metal hydroxides and carbonates. Typical organic bases include ammonia, triethanolamine, and tetramethylethylenediamine. Amine bases especially desirable in the application of the invention to CIJ printing include 3-amino-1-propanol, N,N-dimethanolamine, N,N-dimethylethanolamine, N,N-diethylethanolamine, and triethanolamine. The well known Goods buffers can also be employed.

The inks employed in the invention may contain surfactants added to adjust the static surface tension or dynamic surface tension of the ink to an appropriate level. The surfactants may be anionic, cationic, amphoteric, or nonionic and used at, e.g., levels of 0.01 to 5% of the ink composition. Defoaming agents comprised of phosphate esters, polysiloxanes, or acetylenic diols may further optionally be used with the ink compositions directed at CIJ to reduce foam formation caused by the fluid agitation associated with drop catching and ink recirculation.

The printing ink compositions employed in the present invention, and in particular pigment-based printing inks employed in the present invention, may further be formulated with conventional polymers, dispersants and other addenda to provide durable images that can withstand post printing physical abuse and environmental conditions. In particular, the inks employed may also contain water-soluble or water-dispersible polymers and polymer latexes as is conventional in the art. Water soluble or dispersible anionically charged polymers of the type described for use as dispersants, e.g., may alternatively or additionally be used in printing ink compositions employed in the invention to provide improved jetting performance and improved durability. Acrylic polymers which may be employed in the present invention are exemplified by those disclosed in U.S. Pat. No. 6,866,379, which is incorporated herein in its entirety by reference. Specific examples of preferred water-soluble polymers useful in the present invention are copolymers prepared from at least one hydrophilic monomer that is an acrylic acid or methacrylic acid monomer, or combinations thereof. The water-soluble polymer may also be a styrene-acrylic copolymer comprising a mixture of vinyl or unsaturated monomers, including at least one styrenic monomer and at least one acrylic monomer, at least one of which monomers has an acid or acid-providing group. Such polymers are disclosed in, for example, U.S. Pat. Nos. 4,529,787; 4,358,573; 4,522,992; and 4,546,160; the disclosures of which are incorporated herein by reference. Additional useful anionic charged polymers that may be used in embodiments of the invention include water dispersible polyurethanes, such as those disclosed as binders in pigmented inks in U.S. Pat. No. 6,533,408, and particularly useful polyurethanes for pigmented inkjet inks which exhibit good jetting performance and good resulting image durability are described in US 2004/0085419, the disclosures of both are incorporated herein by reference. US 2006/0100306 and US 2006/0100308 disclose the use of polyurethanes and mixtures of polyurethanes and acrylic polymers having specified acid numbers for use in clear ink compositions, which also may be used in embodiments of the present invention.

A biocide may be added to an inkjet ink composition to suppress the growth of microorganisms such as molds, fungi, etc. in aqueous inks. Preferred biocides for an ink composition are PROXEL GXL (Arch Chemicals Inc.) at a final concentration of 0.0001-0.5 wt. %, and KORDEK MLX (Rohm and Haas Co.) in the same concentration range. Additional additives, which may optionally be present in an inkjet ink composition include thickeners, conductivity enhancing agents, anti-kogation agents, drying agents, waterfastness agents, dye solubilizers, chelating agents, binders, light stabilizers, viscosifiers, buffering agents, anti-mold agents, anti-curl agents, anti-corrosion agent, stabilizers and defoamers. The exact choice of ink components will depend upon the specific application and performance requirements of the printhead from which they are to be jetted. For current continuous ink ejection mode, desirable viscosities are no greater than 10 cP, preferably in the range of 1.0 to 5.0 cP.

Inks employed in the present invention may be applied to a wide variety of substrates, including porous and essentially non porous receivers. Conventional print substrates include photoglossy and plain paper receivers. The two types of receivers are distinguished from one another in that the photoglossy receiver is manufactured with a coated layer above the underlying paper support. Examples of plain papers include: Kodak bright white inkjet paper, Hewlett Packard Color Inkjet paper, Xerox Extra Bright White inkjet paper, Georgia-Pacific Inkjet Paper Catalog Number 999013, Staples inkjet paper, International Paper Great White MultiUse 20 Paper, Xerox Premium Multipurpose Paper, Hammermill Copy Plus or ForeMP paper, and Hewlett Packard Multipurpose paper. The plain papers may include papers that have been treated with multivalent salts during or after manufacture of the paper. Non-porous substrates include, e.g., metal and plastic films or coated supports.

The invention is summarized above. Inkjet printing systems useful in the invention comprise a printer employing a near-IR dryer, at least one printing fluid as described above, and an image recording element (or print substrate), typically a sheet (herein also "media"), suitable for receiving printing fluid from an inkjet printer. The method of the invention employs the inkjet printing system to provide an image on media. Inkjet printing is a non-impact method for producing printed images by the deposition of printing fluid droplets in a pixel-by-pixel manner to an image-recording element in response to digital data signals. There are various methods that may be utilized to control the deposition of printing fluid droplets on the image-recording element to yield the desired printed image, as further discussed above.

The following examples illustrate, but do not limit, the utility of the present invention.

Example 1

Yellow Pigment Dispersion YD-1

To a 10-gallon stainless steel mixing vessel was added 2,560 g water and 2,400 g of a 15% solution of KOH-neutralized dispersant terpolymer, prepared from benzyl methacrylate, stearyl methacrylate, and methacrylic acid at the feed ratio of 37:30:33 by weight, and having an average MW of 8,700 (polymer P-1). Mixing was initiated using a ring-style disperser impeller. Pigment Yellow 74 (Sun Chemical) (1,200 g) was added to the fluid. Milling media comprising beads of polystyrene resin was added slowly while increasing impeller speed, and the mixture was milled for about 20 hours. The dispersion/media mixture was further diluted with water (5,940 g) and biocide KORDEK MLX (Rohm and Haas Co.) (60 g) to a final pigment concentration of about 10%, and the milling media filtered off. A final filtration through a 0.3-micrometer Pall Corp. PROFILE II depth filter yielded roughly 10.6 kg of dispersion. The dispersion had a median particle size of 80 nanometers (Intensity mode) as characterized by Nanotrac Auto Sampler NAS35 (Nanotrac Inc., Nanotrac Brand).

Ink Preparation—

Yellow ink YI-1 was prepared using polymer-dispersed yellow pigment dispersion YD-1 to give a final pigment concentration of 3%, by weight, humectants totaling 3% by weight, SURFYNOL 440 (available from Air Products) at 0.08%, SURFYNOL DF110L @ 0.2%, COBRATEC TT-50S (available from PMC Specialties) at 0.1%, PROXEL GXL (available from Arch Chemical) at 0.03% by weight and a styrene acrylic copolymer having a MW of 16000 at 0.6% by weight. Yellow ink YI-1 contained no added colloidal silica.

Yellow inks YI-2 through YI-5 were prepared similarly as YI-1, but also contained 1, 2, 3 or 4 wt. % of added LUDOX-AM30 colloidal silica (based on dry weight of silica), respectively, as shown in Table 1. LUDOX-AM30 colloidal silica is stabilized with $Na/Al_2O_3$ counterion, and has an average particle size of 12 nm and surface area of 220 $m^2/g$.

Yellow ink YI-6 was prepared similarly as YI-1, but also contained 2 wt. % of added LUDOX-AS30 colloidal silica (based on dry weight of silica) as shown in Table 1. LUDOX-AS30 colloidal silica is stabilized with $NH_4$ counterion, and has an average particle size of 12 nm and surface area of 220 $m^2/g$.

TABLE 1

| Ink ID | Final Ink Pigment concentration (Dispersion) | Additive - Final concentration, by weight, of colloidal silica |
| --- | --- | --- |
| YI-1 (comparison) | 3% (YD-1) | None |
| YI-2 (invention) | 3% (YD-1) | 1% LUDOX AM |
| YI-3 (invention) | 3% (YD-1) | 2% LUDOX AM |
| YI-4 (invention) | 3% (YD-1) | 3% LUDOX AM |
| YI-5 (invention) | 3% (YD-1) | 4% LUDOX AM |
| YI-6 (invention) | 3% (YD-1) | 2% LUDOX AS |

Solution absorbance spectra for the yellow inks YI-1 through YI-5 were obtained, and FIG. 1 shows the spectra of the yellow inks YI-2 through YI-5 containing 1-4% colloidal silica with the spectrum of the non-silica, comparative yellow ink YI-1 subtracted. Thus the spectra show the near-IR absorption due to the presence of the dispersed colloidal silica, above that of the comparative yellow ink.

Example 2

Figure 2:
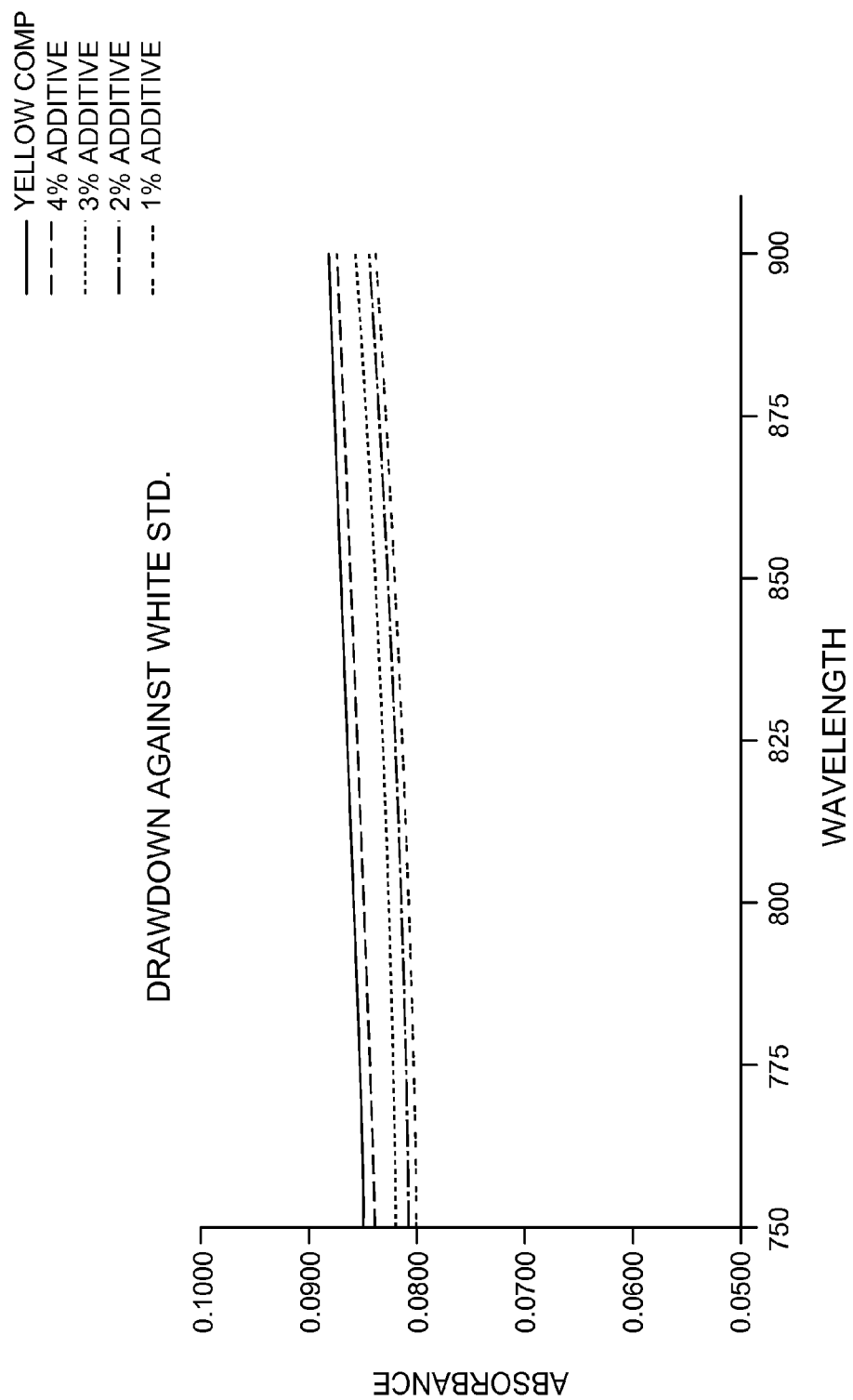
FIG. 2 is a graph illustrating absorption spectra of dried yellow inks with and without incorporated colloidal silica.

Coatings of yellow inks YI-1 through YI-5 were made on STERLING ULTRAGLOSS paper using a drawdown apparatus #3 wire-bound rod, and dried. The spectra of the dried inks are shown in FIG. 2. Once dried, there is virtually no increased absorption for the inks containing the colloidal silica additive compared to the comparative yellow ink. The transparency of the dried silica to near-IR in the dried inks allows the bottom of the ink coating to receive full exposure to the radiation. Only the wet ink, containing the Si—OH functionality, absorbs in the near-IR as shown in FIG. 1.

Example 3

Figure 3:
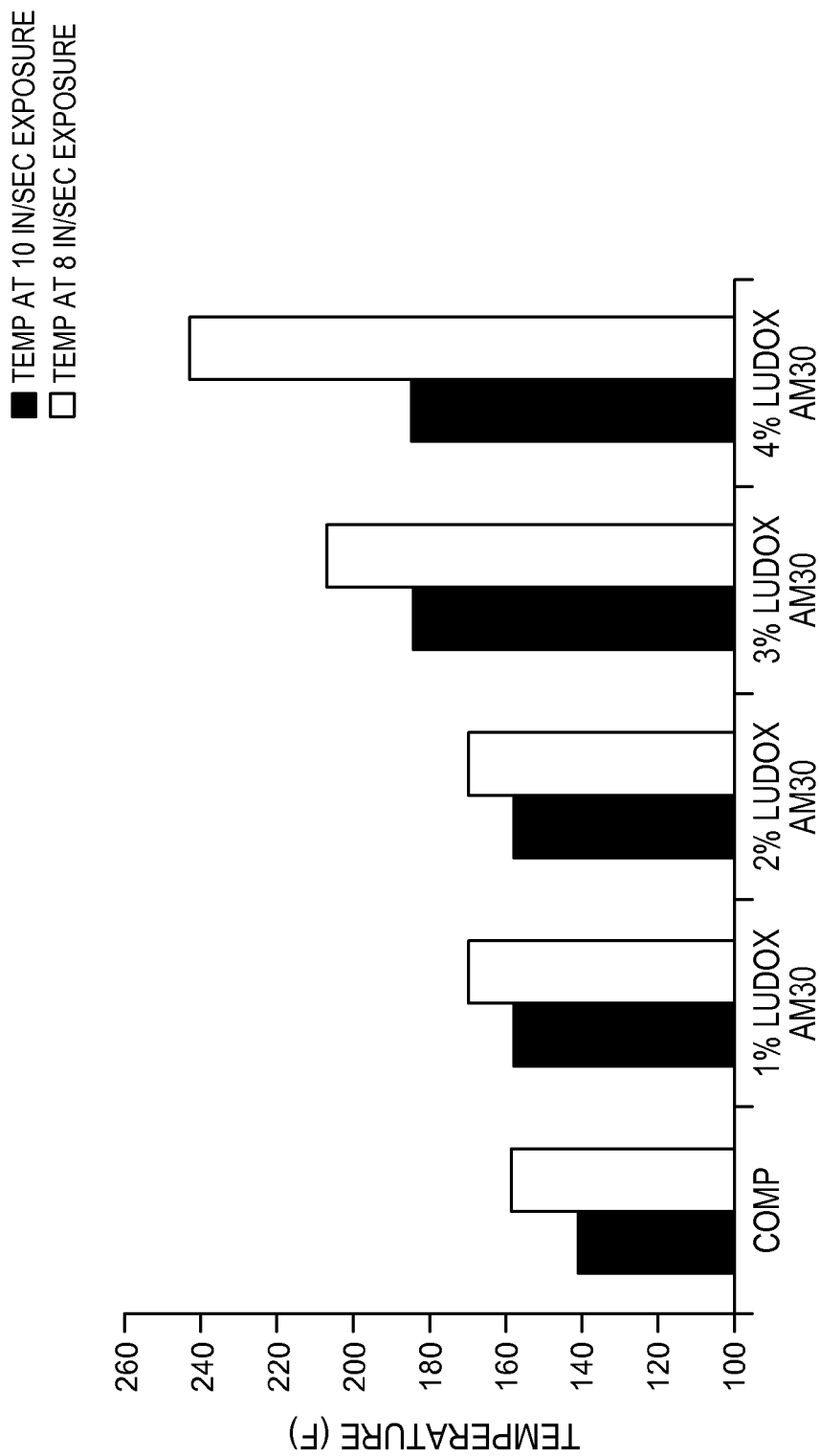
FIG. 3 is a graph illustrating temperature increase of yellow inks containing 0-4% nanoparticulate colloidal silica after exposure to near-IR radiation.

Draw-down coatings of yellow inks YI-1 through YI-5 were prepared as in Example 2, placed on a conveyor belt and passed under a near-IR drying system at such a rate (8 in/sec) that the coating did not completely dry. The temperature of the semi-wet coating was measured upon exiting the near-IR drying system. The coating needed to remain wet and contain the Si—OH absorbing functionality to observe the temperature increase since dried coatings transmit radiation and cool rapidly. FIG. 3 shows the temperature increase of semi-wet coatings of 0-4% silica containing yellow inks after exposure to near-IR radiation and upon exiting the drying system.

The FIG. 1 near-IR solution spectra and FIG. 3 drying experiment results show that the addition of nanoparticulate colloidal silica results in an increased absorption of near-IR radiation and that this energy is converted to thermal energy. The addenda is small enough to not affect gloss and does not affect the ink in a detrimental way at the employed concentrations. The inks maintain good thermal and recirculation stability in a CIJ printer, and inkjet jetting properties are maintained.

Example 4

Draw-down coatings of yellow inks YI-1 and YI-6 were prepared similarly as in Example 3, and placed on a conveyor belt and passed under a near-IR drying system. The temperature of the coating was measured prior to exiting the near-IR drying system, and similarly to the results in Example 3, a greater increase in temperature upon exposure to near-IR radiation was observed for the silica containing yellow ink YI-6 in comparison to that for YI-1.

Example 5

An ink set IS-1 for use with an inkjet printing system employing a near-infrared drying system is prepared, including yellow ink YI-6 in combination with magenta ink MI-1, cyan ink CI-1, and black ink BI-1 prepared as described below.

Magenta Pigment Dispersion MD-1

Magenta pigment dispersion MD-1 is prepared similarly to yellow pigment dispersion YD-1, except Ciba CROMOPHTAL Jet Magenta 2BC is used in place of Pigment Yellow 74. The final pigment dispersion contains about 10% pigment. The dispersion has a medium particle size of 15 nanometers as characterized by Nanotrac Auto Sampler NAS35.

Cyan Pigment Dispersion CD-1

Cyan pigment dispersion CD-1 is prepared similarly to yellow pigment dispersion YD-1, except Pigment Blue 15:3 is used in place of Pigment Yellow 74. The resulting dispersion has approximately 10% pigment. The mean particle size is 21 nm as characterized by Nanotrac Auto Sampler NAS35.

Black Pigment Dispersion PB-1

Black pigment dispersion PB-1 is prepared similarly to yellow pigment dispersion YD-1, except Degussa GmbH. NIPEX 180 IQ carbon black pigment is used in place of Pigment Yellow 74. The resulting dispersion has approximately 10% pigment. The volume-weighted $50^{th}$ percentile particle size distribution diameter is about 62 nm, and the $95^{th}$ percentile particle size distribution diameter is about 110 nm.

Magenta Ink Preparation—

Magenta ink MI-1 is prepared using polymer-dispersed magenta pigment dispersion MD-1 to give a final pigment concentration of 4%, by weight, glycerol 5% by weight, SURFYNOL 465 (available from Air Products) at 0.02%, COBRATEC TT-50S (available from PMC Specialties) at 0.1% and PROXEL GXL (available from Arch Chemical) at 0.1% by weight, and 0.8% by weight SOLSPERSE 46000 from Lubrizol. Magenta ink MI-1 contains no added colloidal silica.

Cyan Ink Preparation—

Cyan ink CI-1 is prepared using polymer-dispersed cyan pigment dispersion CD-1 to give a final pigment concentration of 4%, by weight, glycerol 5% by weight, SURFYNOL 465 (available from Air Products) at 0.02%, COBRATEC TT-50S (available from PMC Specialties) at 0.1% and PROXEL GXL (available from Arch Chemical) at 0.1% by weight, and 1% by weight TETRONIC 908. Cyan ink CI-1 contains no added colloidal silica.

Black Ink Preparation—

Black ink BI-1 is prepared using polymer-dispersed black pigment dispersion PB-1 to give a final pigment concentration of 4.5%, by weight, glycerol 5% by weight, methyl diethanolamine 0.6 wt %, COBRATEC TT-50S (available from PMC Specialties) at 0.1%, PROXEL GXL (available from Arch Chemical) at 0.1% by weight and a water dispersible polyether polyurethane at 0.9% by weight. Black ink BI-1 contains no added colloidal silica.

An ink set IS-2 is prepared similarly as IS-1, except using magenta ink MI-2 in place of magenta ink MI-1. Magenta ink MI-2 is prepared similarly to ink MI-1, but also contains 2 wt. % of added LUDOX-AS30 colloidal silica (based on dry weight of silica).

Color images are printed on a paper substrate at a transport speed of over 100 m/min with ink sets IS-1 and IS-2 in cyan-magenta-yellow-black order on a CIJ Kodak PROSPER PRESS printer employing a near-IR inter-station dryer between yellow and black printing stations and an end-of-line near-IR dryer after the black printing station. Excessive heating of the black ink printed areas is avoided while providing sufficient near-IR energy absorbance to effectively dry the yellow ink printed areas due to the higher percentage of colloidal silica in the yellow ink. Differential heating of the composite printed images is thus reduced, and uniformity of drying is improved.

The invention claimed is:

1. An inkjet ink set for use with an inkjet printing system employing a near-infrared drying system, comprising at least a black ink and a yellow ink, wherein the yellow ink comprises a yellow colorant and dispersed nanoparticulate colloidal silica at a concentration of from 0.1 to about 10 wt %, and the black ink comprises a black colorant and dispersed nanoparticulate colloidal silica at a concentration of from 0 wt % to at most ½ of the wt. % of the dispersed nanoparticulate colloidal silica in the yellow ink, wherein the dispersed nanoparticulate colloidal silica comprises hydrated silica particles which are absorbing in the near-IR spectrum from 750 nm to 900 nm, and wherein the pH of the inks is greater than 7.5 and less than 9.0 so as to obtain improved drying with the near-infrared drying system.

2. The inkjet ink set of claim 1, wherein the yellow ink comprises dispersed nanoparticulate colloidal silica at a concentration of from about 1 to 5 wt %.

3. The inkjet ink set of claim 1, wherein the yellow ink comprises dispersed nanoparticulate colloidal silica at a concentration of from about 1 to 4 wt %.

4. The inkjet ink set of claim 1, wherein the nanoparticulate colloidal silica comprises non porous particles having an average particle size of less than 100 nm.

5. The inkjet ink set of claim 1, wherein the nanoparticulate colloidal silica comprises non porous particles having an average particle size of less than 50 nm.

6. The inkjet ink set of claim 1, wherein the yellow ink comprises dispersed yellow pigment particles.

7. The inkjet ink set of claim 6, wherein the black colorant of the black ink comprises carbon black.

8. The inkjet ink set of claim 7, wherein the black ink comprises 0 wt % dispersed nanoparticulate colloidal silica.

9. The inkjet ink set of claim 6, wherein the yellow pigment particles are dispersed with a polymeric dispersant, are dispersed with a surfactant, or are self dispersed without the need for a separate dispersant.

10. The inkjet ink set of claim 1, wherein the black colorant of the black ink comprises carbon black.

11. The inkjet ink set of claim 1, further comprising a magenta ink and a cyan ink.

12. The inkjet ink set of claim 11, wherein the magenta ink comprises dispersed nanoparticulate colloidal silica at a concentration of from 0.1 to about 10 wt %, and the black ink comprises dispersed nanoparticulate colloidal silica at a concentration of from 0 wt. % to at most ½ of the wt. % of the dispersed nanoparticulate colloidal silica in the magenta ink.

13. The inkjet ink set of claim 12, wherein the cyan ink comprises dispersed nanoparticulate colloidal silica at a concentration of from 0 wt. % to at most ½ of the wt. % of the dispersed nanoparticulate colloidal silica in the yellow ink.

14. The inkjet ink set of claim 13, wherein the cyan ink comprises 0 wt % dispersed nanoparticulate colloidal silica.

15. The inkjet ink set of claim 11, wherein the cyan ink comprises dispersed nanoparticulate colloidal silica at a concentration of from 0 wt. % to at most ½ of the wt. % of the dispersed nanoparticulate colloidal silica in the yellow ink.

16. The inkjet ink set of claim 15, wherein the cyan ink comprises 0 wt % dispersed nanoparticulate colloidal silica.

* * * * *